May 11, 1965 G. O. GABRIEL 3,183,385

TURNTABLE DRIVE SYSTEM

Filed Dec. 19, 1962

2 Sheets-Sheet 1

INVENTOR
GUSTAVE O. GABRIEL
BY
Dick, Zarley & Henderson
ATTORNEYS

INVENTOR
GUSTAVE O. GABRIEL
BY
Dick, Zarley & Henderson
ATTORNEYS

United States Patent Office 3,183,385

Patented May 11, 1965

3,183,385

TURNTABLE DRIVE SYSTEM

Gustave O. Gabriel, Columbus, Nebr.
(P.O. Box 5285, Fulton Road Station, Mobile, Ala.)

Filed Dec. 19, 1962, Ser. No. 245,826
5 Claims. (Cl. 310—103)

This invention relates to apparatus for transmitting drive from a motor and particularly to a drive system for maintaining a rotating element at a constant speed for use in recording or reproducing sound.

In the art of phonograph sound recording and reproduction wherein the disc type of record is employed, the record supporting turntable is generally driven at either of several standard speeds, such as 33⅓ or 78 revolutions per minute. Briefly, the turntable is usually driven by a motor through gears and shafts.

It is well known that it is desirable to have the turntable rotate at a constant and uniform speed in order to eliminate distortion, variations in speed changing the frequency of the sound being recorded and reproduced. Various methods of and means for obtaining a substantially constant speed have been suggested and employed, some of these prior methods utilizing magnetic coupler structures for transmitting drive from the gears to the turntable.

It is therefore, an object of this invention to provide an improved structure wherein the rotation of a drive element is imparted to a driven element solely by a magnetic arrangement, obviating any direct mechanical connection.

Another object of this invention is to provide an improved magnetic transmission wherein the driven member is immediately locked into step with the drive member upon initial rotation of the latter, preventing thereby drift therebetween during the maintaining of a constant speed.

Yet another object of this invention is to provide an improved magnetic coupling for transmitting motion from a motor drive assembly to a turntable assembly, wherein both assemblies are independently mounted, with the turntable assembly adjustably mounted for determining the air gap between respective drive and driven elements of the magnetic coupling.

Still another object of this invention is to provide an improved drive system for a phonograph featuring and including the above designated structures capable of attaining the objectives mentioned therein, wherein the said drive system is economical, simple in design and construction, and effective.

These objects and other features and advantages of this invention will become readily apparent upon reference to the following description, when taken in conjunction with the accompanying drawings, wherein.

Figure 1:
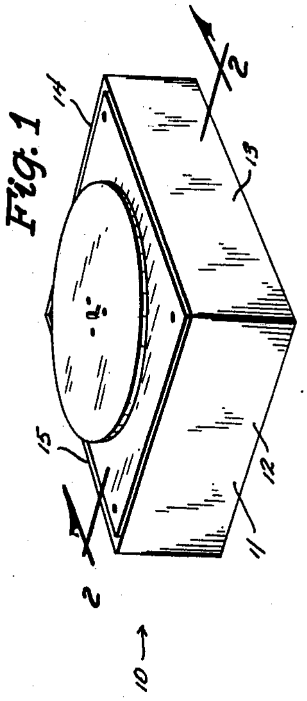
FIG. 1 is a perspective view of a phonograph embodying the structure of this invention.

Referring now to the drawings, the phonograph of this invention is indicated generally at 10 in FIG. 1 and comprises a square housing 11 having side walls 12, 13, 14 and 15, a turntable unit 16 resiliently mounted on the housing 11, and a motor unit 17 also resiliently mounted on the housing 11. The turntable unit 16 is not mechanically connected to the motor unit 17, but as described in detail hereinafter receives drive imparted therefrom by magnetic means.

Figure 2:
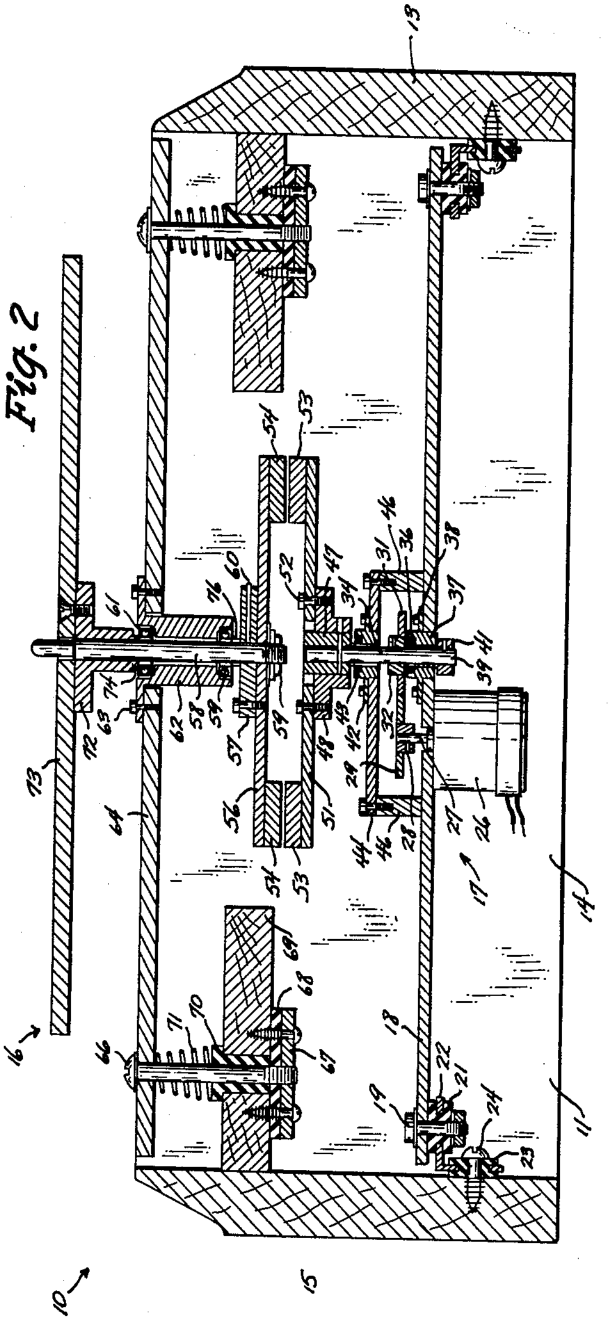
FIG. 2 is an enlarged cross-sectional view taken along the line 2—2 in FIG. 1.
Figures 3, 4, 5:
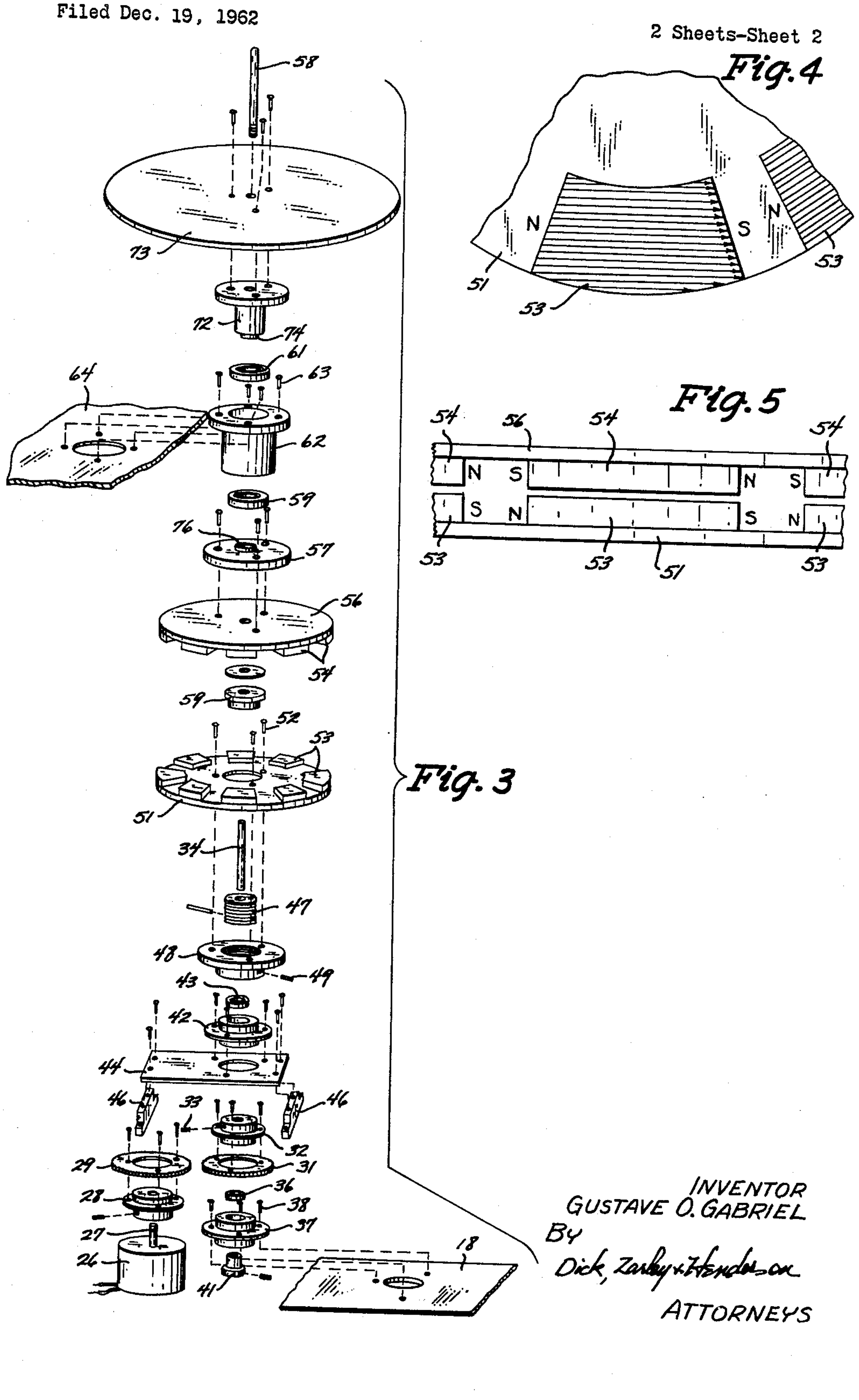
FIG. 3 is a fragmentary, exploded view of the majority of the structure shown in FIG. 2.
FIG. 4 is a fragmentary, enlarged view of one of the permanent magnets used in the magnetic coupling, showing the magnetic lines of force.
FIG. 5 is a fragmentary, enlarged view of a pair of spaced drive and driven magnets, showing the opposed polarity.

Referring particularly to FIGS. 2 and 3, the motor unit 17 includes a square plate 18 secured by a quartet of cap screws 19 to a like number of rubber grommets 21 each of which is mounted to a horizontally disposed leg of a plate support angle 22. The support angles 22 are also mounted on rubber grommets 23 which are in turn secured by wood screws 24 to the housing side walls 12–15.

At an off-center location on the plate 18, a synchronous motor 26 is secured by any conventional means to the plate 18 and has a drive shaft 27 extended upwardly through a plate opening therefor. A hub 28 (FIG. 3) to which a drive gear 29 is secured is mounted on the upper end of the drive shaft 27, and the drive gear 29 is in mesh with a driven gear 31 also secured to a hub 32 (FIG. 3). The hub 32 is secured by a pin 33 (FIG. 3) to a jack shaft 34 the lower end of which is rotatably mounted in a bearing 36 mounted in turn in a bearing housing 37. The bearing housing is secured by a plurality of machine screws 38 to the motor support plate 18, and the lower end 39 of the jack shaft 34 has a collar 41 secured thereto below the plate 18.

The jack shaft 34 extends through another bearing housing 42 and bearing 43 mounted in a bearing plate 44 and supported above the motor support plate 18 on a pair of standoff legs 46. On the upper end of the jack shaft 34, an externally threaded hub 47 is mounted by a pin and threaded thereon is a hub collar 48. When adjustably threaded onto the hub 47, the collar 48 is secured to the hub 47 by a fastening screw 49. A circular disc 51 is mounted on the collar 48 by a plurality of cap screws 52, and secured to the upper circumferential surface of the disc 51 in arcuately spaced relation are a plurality, namely eight, of Lodex permanent magnets 53.

As best illustrated in FIG. 4, the direction of magnetization is from one end of each magnet to the other horizontal to the thickness of the magnet 53, whereby a north pole and a south pole are disposed at opposite ends of the respective magnet. The arcuately spaced magnets 53 are arranged on the disc 51 so that alternate poles are opposite each other.

Spaced directly above the motor drive unit disc 51 are another plurality, namely eight, of Lodex permanent magnets 54. These magnets 54 are mounted on another circular disc 56 which is part of the turntable unit 16. The upper Lodex magnets 54 are identical to the lower magnets 53, with the exception that they are arranged with their poles reversed to those of the lower magnets 53 as illustrated in FIG. 5.

The upper disc 56 is connected to a hub 57 in turn secured to the lower end of a shaft 58 by a drill pin 60, and wherein an elastic stop nut 59 is threaded onto the shaft end. The shaft 58 extends through a pair of bearings 59 and 61 mounted in a main bearing housing 62 which in turn is connected by cap screws 63 to the center of an aluminum deck plate 64 on which, although not shown, a playback arm would be mounted.

A resilient mounting is provided for the deck plate 64 by a quartet of adjusting screws 66 each of which is threaded into a mounting bracket 67 secured via rubber discs 68 to a shelf member 69 for each side wall. To complete the resilient mounting, a stem bumper 70 for each adjusting screw 66 is inserted through each shelf member 69, and a conical spring 71 is inserted between the deck plate 64 and the upper surface of each stem bumper 70.

Press fitted to the upper end of the shaft 58 is a hub 72 and mounted thereon in a perfectly balanced relationship is a turntable 73. The shaft 58 extends upwardly beyond the turntable 73 to serve as a centering guide for a record placed thereon.

It will be noted that the lower reduced end 74 of the hub 72 has a diameter which corresponds substantially to the diameter of the inner race of the upper bearing 61. Further, the upper reduced end 76 of the upper disc hub 57 is also of a diameter substantially equal to the diameter of the inner race of the lower bearing 59. Upon tightening of the elastic stop nut 59, the hubs 72 and 57 are tightened together and against the bearings 59 and 61 until no up or down play exists.

To adjust the air gap between the upper and lower magnets 54 and 53, respectively, both the motor unit hub 47 and collar 48 are threadable; and all four adjusting screws 66 are rotatable to move the respective sides of the deck plate 64 upwardly or downwardly relative to the shelf members 69. For a five pound turntable 73, the air gap should be approximately 0.045 inch; for an eight pound turntable 73 the air gap should be approximately 0.035 inch, and for a twelve pounder, approximately 0.025 inch.

In operation of the phonograph, a thirty r.p.m. synchronous motor 26 has been found to give sufficient power to the gears 29 and 31, manufactured of Delrin, which results in a 33⅓ r.p.m. speed for the jack shaft 34 and the lower magnetic disc 51. Due to the opposed pole relationship of the upper and lower magnets 54 and 53, and their identical circumferential spacing, immediately upon rotation of the lower disc 51 the upper magnets 54 lock into step immediately, thereby rotating the upper shaft 58 and turntable also at a constant 33⅓ r.p.m.

In summation, a drive system for a phonograph is described which includes a motor unit resiliently mounted within and to a housing, a gear unit for providing the proper output rate of rotation, a lower part of a magnetic coupling adjustably mounted to said gear unit, a tone arm deck plate adjustably and resiliently mounted on and within the housing, the upper part of the magnetic coupling rotatably connected to said deck plate, and a turntable rotatably mounted on said deck plate and operably connected to said magnetic coupling upper part. By this arrangement, either or both upper and lower part of the magnetic coupling can be adjusted with respect to the air gap therebetween, with the adjustment of one part not mechanically affecting the other part of the coupling.

Some changes may be made in the construction and arrangement of my turntable drive system without departing from the real spirit and purpose of my invention, and it is my intention to cover by my claims, any modified forms of structure or use of mechanical equivalents which may be reasonably included within their scope.

I claim:

1. A drive system for a phonograph turntable comprising in combination:
   housing means;
   plate means resiliently mounted on said housing means;
   motor means mounted on said plate means;
   gear means operably connected to said motor means for transmitting drive therefrom;
   deck means resiliently mounted on said housing means;
   means including a turntable rotatably mounted on said deck means; and
   magnetic means for coupling said turntable means to said gear means for transmitting drive therebetween,
   said magnetic means including a pair of normally vertically spaced discs each having a like plurality of circumferentially spaced permanent magnets mounted on opposed surfaces of said discs, said vertically spaced magnets having opposed polarities whereby the magnetic coupling is provided for transmitting drive between said turntable means and said gear means.

2. A drive system for a phonograph turntable comprising in combination:
   housing means;
   plate means resiliently mounted on said housing means;
   motor means mounted on said plate means;
   gear means operably connected to said motor means for transmitting drive therefrom;
   deck means resiliently mounted on said housing means;
   means including a turntable rotatably mounted on said deck means; and
   magnetic means for coupling said turntable means to said gear means for transmitting drive therebetween,
   said housing means including a plurality of upstanding side walls with a shelf member secured to each side wall,
   said plate means including a horizontally disposed plate, a plurality of support angles, resilient means secured to said support angles and fastening means securing said resilient means to said plate and to said side walls,
   said deck means being resiliently mounted on said shelf members.

3. A drive system as characterized in claim 2 and wherein said deck means includes a flat deck plate, a plurality of fastening devices secured to said shelf members, resilient means interposed between said fastening devices and said shelf members, spring means mounted between said deck plate and said resilient means and responsive to the position of said fastening devices.

4. A drive system as characterized in claim 3 and wherein said turntable means includes a bearing housing secured to said deck means, a pair of bearings mounted at either end of said bearing housing, a shaft inserted through said bearings, an upper hub secured to said shaft and mounted on the inner race of the upper one of said bearings, a turntable mounted on said upper hub, and a lower hub secured to said shaft and engaged with the inner race of the lower one of said bearings.

5. A drive system as characterized in claim 4 and wherein said magnetic means includes a pair of normally vertically spaced discs each having a like plurality of circumferentially spaced permanent magnets mounted on opposed surfaces of said discs, said vertically spaced magnets having opposed polarities whereby the magnet coupling is provided for transmitting drive between said turntable means and said gear means.

References Cited by the Examiner

UNITED STATES PATENTS

| | | | |
|---|---|---|---|
| 2,300,778 | 11/42 | Cornwell | 310—103 |
| 3,113,228 | 12/63 | Tolegian | 310—103 |

MILTON O. HIRSHFIELD, *Primary Examiner.*

DAVID X. SLINEY, *Examiner.*